July 24, 1923.

C. A. FOX

BOX

Filed May 28, 1921  2 Sheets-Sheet 1

1,463,074

WITNESSES

INVENTOR
CHARLES A. FOX
BY
ATTORNEYS

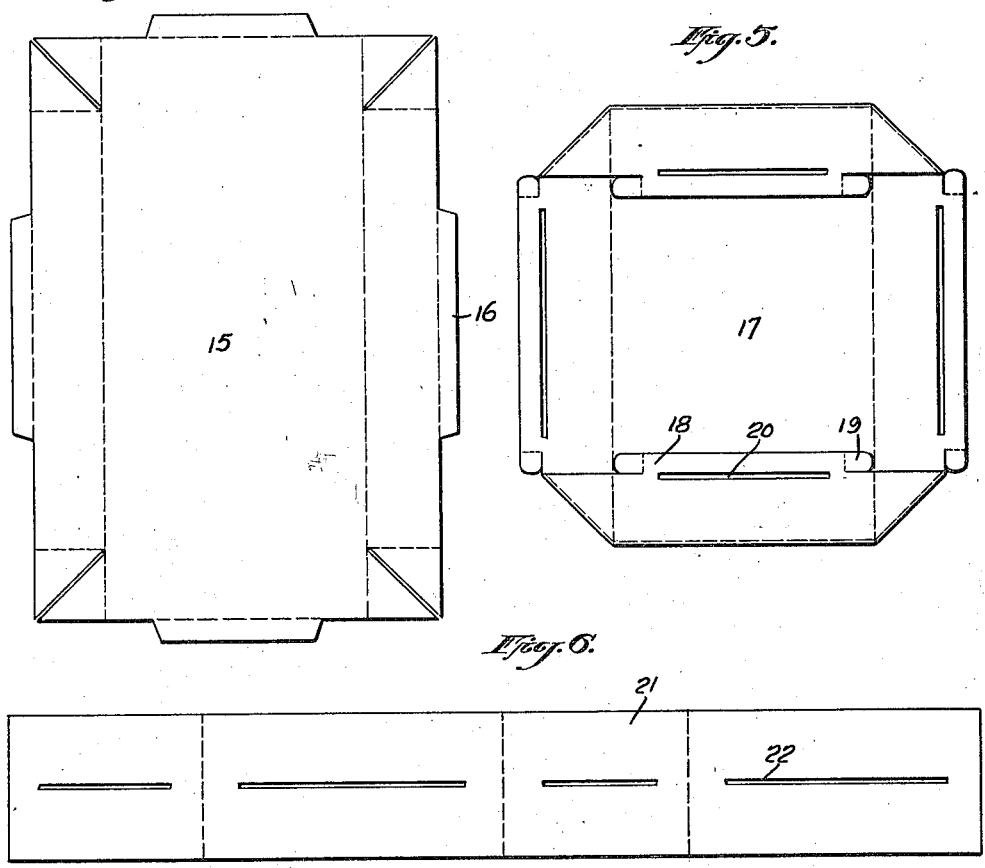

Patented July 24, 1923.

1,463,074

UNITED STATES PATENT OFFICE.

CHARLES AUGUSTUS FOX, OF NEW YORK, N. Y.

BOX.

Application filed May 28, 1921. Serial No. 473,547.

*To all whom it may concern:*

Be it known that I, CHARLES AUGUSTUS FOX, a citizen of the United States, and resident of the city of New York, borough of Manhattan, in the county of New York and State of New York, have invented a new and Improved Box, of which the following is a full, clear, and exact description.

My invention relates to a receptacle and aims to provide a container more particularly in the nature of a box, such as is utilized for the storage and shipment of articles.

It is a well appreciated fact in connection with receptacles comprising a lid and body portion, that in shipment, great losses of merchandise occur incident to the fact that persons are able to distort the lid and body of the receptacle so that they may insert their hand in the space thus provided, and withdraw certain of the articles from the receptacle without breaking the sealing or attaching means retaining the lid in applied position upon the body of the receptacle.

Aside from this, it is well understood that a great amount of merchandise particularly fine silk, etc. is injured incident to the entrance of dust, moisture, etc. between the lid and body of the receptacle.

With this in mind my present invention aims to provide a receptacle comprising a lid and body, the elements of which will cooperate with each other in such a manner as to effectually preclude the possibility of withdrawal of any of the contents of the receptacle without either visibly injuring the receptacle so that the consignee will immediately become aware of the fact, or entirely removing the lid from the body of the receptacle, thus necessitating the destruction of the sealing or attaching means utilized for retaining the lid upon the body.

A further object of my invention is the construction of a device of the class described which will guard against the entrance of foreign matter into the interior of the receptacle in a far more effective manner than has heretofore been possible.

Still another object of my invention is the construction of a receptacle which may be provided in either a "ready constructed" or "knock-down" form and which may be placed upon the market at a small figure.

Still other objects of my invention will become apparent in the annexed specification taken in connection with the drawings which latter present practical embodiment of the same, and in which;

Figure 3 is a transverse sectional view similar to Figure 2 but showing a slightly different form of box.

Figure 4 shows the lid in its blank or knock-down form,

Figure 5 is a view of the body of the box in partly assembled condition, and

Figure 6 illustrates a detail of construction utilized in connection with the type of box illustrated in Figure 3.

Figure 1:
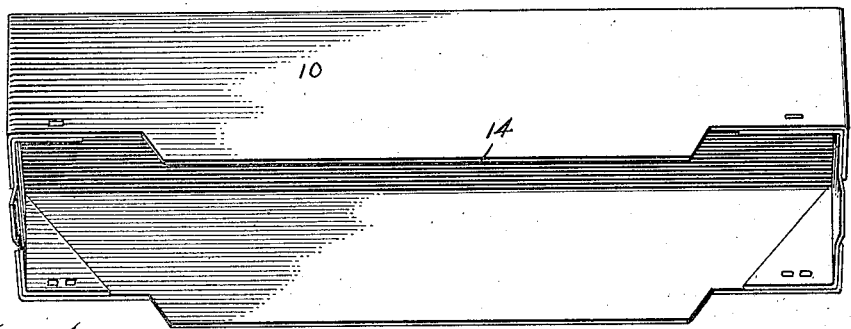
Figure 1 is a perspective view of the lid and body of a box constructed in accordance with my improved invention and showing the same detached from each other.
Figure 2:
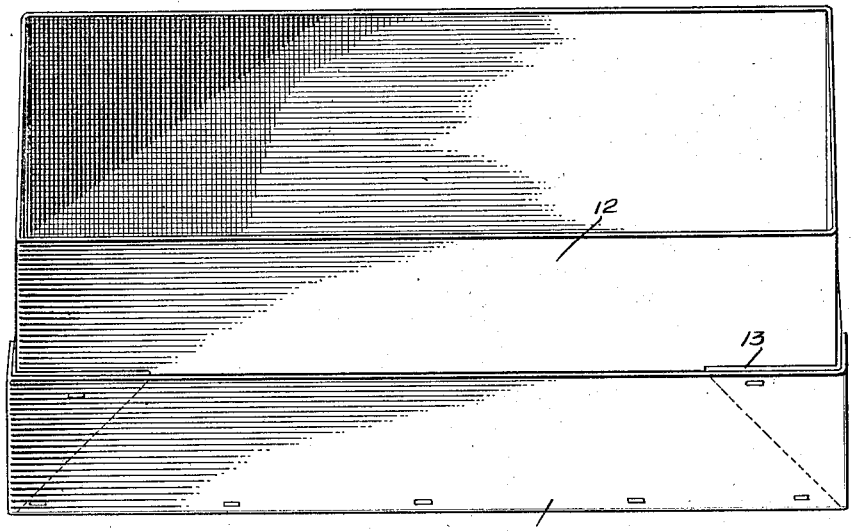
Figure 2 is a transverse sectional view taken through this type of box and showing the parts assembled.
Figure 2:
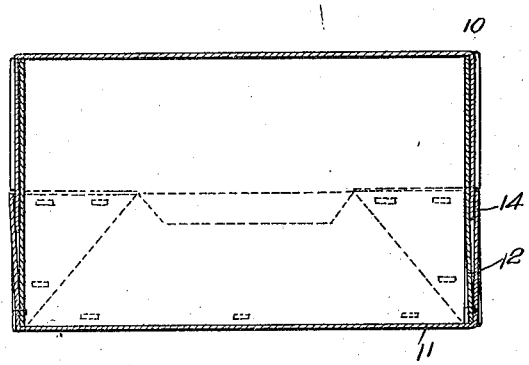

Referring now more particularly to Figures 1 and 2 it will be seen that the reference numeral 10 indicates a lid of any desired shape and material which is to be associated with the body 11 of a receptacle, the latter being of a shape corresponding to the lid 10 and being also of any desirable material, and preferably including in the usual manner, an apron 12 which is overlapped and encircled by the body of the lid 10.

Contrary to the conventional construction it will be seen that the apron 12 of the receptacle is preferably spaced from the upper edge of the body 11 thereof by any suitable means such as by utilizing corner pieces or flaps 13 interposed between the two and thus a space is presented suitable for the reception of integral tongues 14 adapted to extend into the space thus provided, as has been indicated in Figure 2.

Thus it will be obvious that the lid may be readily associated with the body of the box, the tongues extending as aforestated into the space existing between the apron 12 and the body 11 of the box and the free edge of the rim of the lid engaging the adjacent edges of the flaps 13 to support the lid in position. Upon suitable tying means such as cord, retaining the lid in applied position, upon the body of the box, it will be obvious that a person will be unable to insert his hand between the lid and the apron 12, and so into the body of the receptacle, by virtue of the fact that the tongues 14 will prevent this being done. Thus if an unauthorized entrance is to be gained into the receptacle it will be necessary for a person to primarily insert his hand downwardly into the space existing between the apron 12 and body 11, thence upwardly along the apron 12 between the upper edge of the same and the inner base of the box lid, and so into the body of the receptacle. Obviously this would be impossible and thus the difficulty heretofore experienced in shipment will be precluded.

It will be understood that the entrance of foreign matter into the body of the receptacle is also precluded by this construction in that it will be virtually impossible for any quantity of foreign matter to follow a course aforedescribed.

Where a "knock down" box is provided, the lid of which has been illustrated in Figure 4, it will be seen that this lid 15 may be of any desirable type and material and may incorporate any interlocking construction (not shown). As in the lid shown in Figure 1, this type of lid is also formed with tongues 16.

With respect to the body of the box attention is invited to Figure 5 and it will be seen in this figure that a box 19 of conventional "knock down" construction is utilized with the exception however that tabs 18 are provided in the upper edges of the same, these tabs having their ends terminating in flaps 19, and slots 20 being cut in the side walls of the box.

The lid is now folded to its complete form and the same operation is resorted to in connection with the body of the box. A liner 21 shown in Figure 6 is now bent at the lines of folding, and it is to be noted that the slots 20 formed in this liner are of sufficient length to accommodate the body of the tabs 18. Thus, as has been shown in Figure 3, the tabs 18 are passed through the slots 22 and the flaps 19 are subsequently spread out so as to lock the body of the box and the liner with respect to each other, the latter element providing an apron 23 corresponding to the apron 12 of the box illustrated in Figures 1 to 3.

It will be noted in this construction that the lid is applied to the body of the box and that the tongues 16 of this lid are inserted through the slots 20 formed in the side walls of the box thus producing cooperation of the parts as in connection with the first described type of receptacle.

Thus it will be seen that all of the objects set forth in the preamble of this specification have been accomplished, and it will be understood that numerous modifications of structure might readily be resorted to without in the least departing from the scope of my claims.

What is claimed is:

1. A receptacle including a body portion and a lid, an apron arranged within said body portion and spaced therefrom whereby to provide recesses, a lid, tongues forming an integral part of the lower edge of said lid, said lid being adapted to have its lower edge rest upon the upper edge of said body portion and encircling the upper part of said apron, said tongues being adapted to extend into the recesses extending between said body portion and apron.

2. A box comprising tray-like sections, a lining fitted within the rim of one section over which the rim of the other section is adapted to fit, and securing elements engaging through the first named rim and lining, one rim having extension flaps to overlap the other.

3. A box comprising tray-like sections, a lining secured within the rim of one section and over which the rim of the other section is adapted to fit, the first named section having portions between the rim thereof and lining against which the edge of the second named rim is seatable when fitted on said lining, the first named rim having portions to overlap the second named rim.

4. A box comprising tray-like sections, a lining secured within the rim of one section and over which the rim of the other section is adapted to fit, the first named rim having flaps extending between said rim and lining, said flaps being arranged to provide seats for the edge of the second named rim when fitted on said lining, the first named rim having portions to overlap the second named rim.

5. A tray-like box section having a rim and a lining secured within said rim and adapted to have the rim of another tray-like section fitted thereon, the first named rim having flaps securing the walls thereof together and disposed between said walls and the lining to provide seats for the second named rim, said walls having portions to overlap the second named rim when fitted on the lining.

CHARLES AUGUSTUS FOX.